Sept. 30, 1952

J. REBMAN 2,611,966

EXTENSOMETER

Filed Feb. 9, 1950

INVENTOR.
Jack Rebman

BY Adams, Stevens & Mase

AGENTS.

Patented Sept. 30, 1952

2,611,966

UNITED STATES PATENT OFFICE 2,611,966

EXTENSOMETER

Jack Rebman, Columbus, Ohio, assignor, by mesne assignments, to The Battelle Development Corporation, Columbus, Ohio, a corporation of Delaware Application February 9, 1950, Serial No. 143,244

6 Claims. (Cl. 33—148)

1

This invention relates to measuring instruments and more particularly to a novel extensometer for measuring the degree of elongation of a given material under varying loads, and which extensometer is firmly attached to the specimen in a manner to accurately indicate the degree of elongation thereof, but automatically releases itself from the specimen prior to the time the ultimate tensile strength of the specimen is exceeded and the specimen breaks.

Extensometers are used to measure the degree of elongation of specimens during testing in tension and to determine the modulus of elasticity, the yield point, and other physical characteristics. When tension is applied until the specimen breaks, there is great danger of injury to the measuring instrument. In devices of the prior art, it has been necessary to stop the tests and to remove the extensometer from the specimen before the breaking point is reached. In high-speed testing, this procedure is highly impractical. Also, the exact point of rupture cannot always be predicted.

It is often desirable to test metal specimens which have been heated to a high temperature by means of induction or electrical resistance heating. Consequently, it has been found necessary to devise some means to protect the extensometer from the high temperature of the test specimen and also to insulate the indicating or recording mechanism from any heat or electrical currents.

Accordingly it is one of the objects of this invention to provide an extensometer for use in high-speed tension testing whereby the extensometer is quickly released from contact with a test specimen before the breaking point is reached and without the necessity of stopping the test.

A further object is to provide an extensometer which may be used in testing specimens heated to a high temperature.

Yet another object is to provide a device for testing in tension a specimen heated by electrical resistance whereby the indicating or recording mechanism is insulated from any electrical current.

A still further object is to provide means in an extensometer for automatically releasing the extensometer from the test specimen before the breaking point is reached.

Other objects and advantages will be apparent from the following detailed description and the accompanying drawings wherein similar characters of reference designate corresponding parts, and wherein:

2

Figure 1:
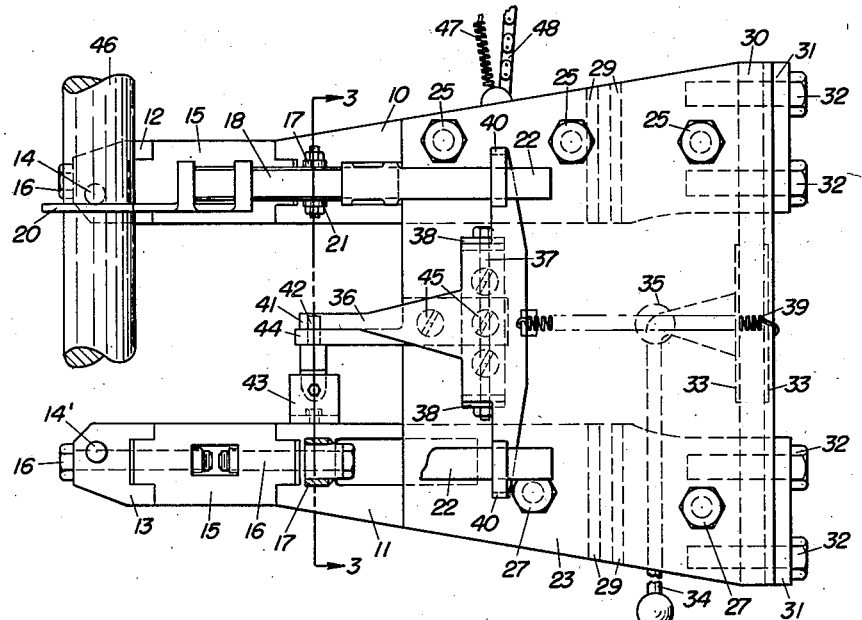
Figure 1 represents a top view, partially broken away, of an extensometer embodying the present invention.

In general, this novel extensometer comprises two nonflexing arms, each of which has one end adapted to be slightly imbedded in a test specimen. Supported on each of these arms is a clip arm which holds the extensometer firmly to the specimen. The free ends of the nonflexing arms are joined by a flexible plate. Elongation of the specimen during testing in tension laterally separates the arms, thereby flexing the plate, and a measurement of this flexing of the plate indicates the amount of elongation of the specimen. A yoke mechanism acts on the clip arms to hold the extensometer in contact with the specimen, and then to automatically release it.

A preferred embodiment, as shown in the drawings, comprises two nonflexing arms 10 and 11, which terminate in end pieces 12 and 13. Mounted in the end pieces 12 and 13 are upstanding engaging points 14 and 14'. These end pieces and engaging points are preferably constructed of some temperature-resistant alloy such as Inconel-X. The end pieces 12 and 13 are rigidly connected to ceramic or other insulating sections 15 by means of screws and bolts or other suitable fastenings 16. The insulating sections 15 are fastened to the main portions of the nonflexing arms 10 and 11 in a similar manner.

U-shaped supports 17 fastened to nonflexing arms 10 and 11 pivotally support clip arms 18 and 19 by means of bolts and nuts, or other suitable fastenings 21. The clip arms 18 and 19 include insulating sections similar to the insulating sections 15 of the nonflexing arms 10 and 11. Clip-arm hooks 20 and 20' positioned directly over the upstanding engaging points 14 and 14' are rigidly attached to the clip arms. The opposite ends of clip arms 18 and 19 terminate in flat springs 22. The clip-arm hooks 20 and 20' and the springs 22 are preferably provided with tabs for bending and securement to the clip arms 18 and 19, to avoid weakening the insulating material by drilling holes for bolts or similar fastening means.

Figure 2:
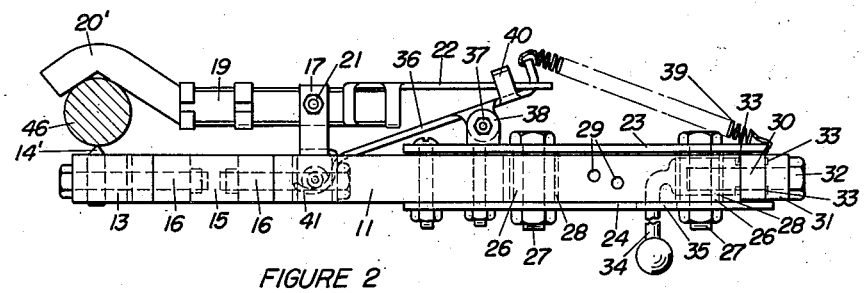
Figure 2 is a side view of the extensometer.
Figure 3:
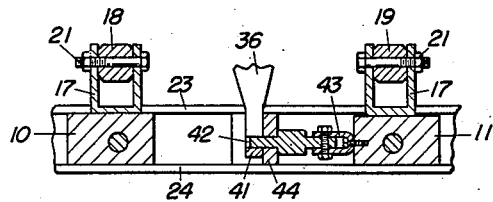
Figure 3 is a partial section taken along the line 3—3 of Figure 1.

The nonflexing arms 10 and 11 are mounted in spaced parallel relationship between two guide plates 23 and 24, as shown in Figure 2 of the drawings. Guide plates 23 and 24 are rigidly attached to arm 10 by means of fastenings 25. Arm 11 may be slightly thinner than arm 10 or the guide plates 23 and 24 may be so spaced from each other that the arm 11 may move freely laterally about a preselected pivot point or points between guide plates 23 and 24, which are maintained in spaced relation by guide plate spacers 26, and rigidly held in place by fastenings 27. Such lateral movement of arm 11 is limited by the sloppy fit of the guide plate spacers 26 in oversized holes 28 drilled through the arm, thereby preventing damage to the extensometer due to excessive separation of arms 10 and 11.

Cooling holes 29 are drilled in nonflexing arms 10 and 11 through which air can be forced if additional cooling is desired when high temperatures are used.

The free ends of nonflexing arms 10 and 11 are connected by a flexible plate 30 which is preferably made of aluminum or some other material which will give a minimum restraint to the movement of arm 11. Flexible plate 30 is secured to non-flexing arms 10 and 11 by retainer plates 31, utilizing suitable fastenings 32.

One or more wire strain gages 33 are mounted on the surfaces of plate 30 and connected by means of a Wheatstone bridge or similar circuit to suitable indicating or recording mechanism. Since the flexing of the plate 30 is proportional to the lateral movement of nonflexing arm 11 about its pivot point the elongation of a test specimen may be easily determined. Lead wires 34 may be passed through a hole 35 in guide plate 24 to protect the connection to the strain gage. Although satisfactory readings may be made by using a single active strain gage, the use of two or more, preferably in pairs, will give a greater sensitivity and will compensate for temperature changes.

A releasable yoke 36 is pivotally mounted on guide plate 23 by means of bolt 37 which passes through brackets 38 extending upward from guide plate 23. The upper end of yoke 36 presses against clip-arm springs 22 thereby holding clip arms 18 and 19 firmly against a test specimen. A trigger return spring 39 is connected between the upper end of yoke 36 and guide plate 23, and acts to release the pressure of clip arms 18 and 19 on the test specimen by the action of tabs 40, which are an integral part of yoke 36 and are bent around the clip-arm springs 22.

The lower end of yoke 36 is curved to form a hook 41. This hook engages a trigger pin 42 which is connected to a U-shaped mounting 43, removably attached to nonflexing arm 11, in such a manner that lateral movement of nonflexing arm 11 will cause the trigger pin 42 to move laterally. Trigger pin 42 is guided by support 44, mounted on guide plate 23 by means of screws 45.

To operate the extensometer indentations are made in a test specimen 46. In most standard testing machines these marks are made two inches apart, but the distance may be varied when desirable. The extensometer is connected to specimen 46 in the following manner:

Engaging point 14 on nonflexing arm 10 is fitted against one of the indentations in the test specimen. Yoke 36 is pivoted against the action of trigger return spring 39 until hook 41 is depressed sufficiently to permit the trigger pin 42 to engage it. While yoke 36 is held in this depressed position, engaging point 14' on nonflexing arm 11 is fitted into the second indentation on specimen 46. This moves trigger pin 42 so that it engages hook 41 retaining it in a depressed position. In this position the upper end of yoke 36 is forced against clip-arm springs 22, thereby holding the clip arms 18 and 19 firmly against specimen 46 and securing the extensometer in operating position.

When a tensile force is applied to test specimen 46, causing it to elongate, engaging point 14' and rigid arm 11 move apart from engaging point 14 and arm 10. This movement causes flexure plate 30 together with the strain gages 33 to bend. As nonflexing arm 11 moves apart from arm 10 during the testing, trigger pin 42 moves with it. When arm 11 is moved a sufficient distance, trigger pin 42 will no longer engage hook 41, and trigger return spring 39 acting on yoke 36 causes it to pivot about its supports 37, relieving the pressure on clip-arm springs 22 and thereby permitting the extensometer to fall free from test specimen 46.

A spring 47 and chain 48 may be connected to the extensometer as shown in Figure 1. The spring 47 supports the weight of the extensometer during testing so that very small force couples are applied to engaging points 14 and 14'. The chain 48 retains the extensometer to the testing machine after it has been released from the specimen in order to prevent damage to the extensometer as it falls free.

By varying the length of trigger pin 42 the extensometer may be adjusted to release from test specimen 46 after any particular increase in length of the specimen. Trigger pins of varying lengths may be supplied, or the trigger pin may be made adjustable as to length in any well-known manner. The amount of elongation before rupture may be determined by calculation or preliminary testing, and the proper length of trigger pin can then be selected. Although it is customary to test specimens vertically in a testing machine, it can be seen that this extensometer may be easily attached to a test specimen held in either a horizontal or vertical position.

As can be seen by the preceding description, this extensometer is particularly desirable for high-speed testing. It is simple in construction and does not require particular technical skill for operation. In addition parts may be easily replaced.

It will be understood that modifications may be made in the design and arrangement of the parts, without departing from the scope of the invention which is intended to be limited only as required by the following claims. It will be further understood that the size of the apparatus may vary, depending upon the size of material with which it is to be used.

What is claimed is:

1. In a substantially U-shaped gage comprising a frame and two relatively movable specimen-contacting arms and having means pivotally mounted on said arms to hold a specimen in contact with said arms, a release mechanism comprising a lever pivotally mounted on said frame, one end of said lever adapted to contact said specimen-holding means and hold them firmly against a specimen, a hooked member on the other end of said lever, means mounted on one of said arms to slidably engage said hook until said arms have relatively moved a predetermined distance, and resilient means between said frame and said lever whereby said lever will be moved from contact with said specimen-holding members.

2. A gage comprising a frame, a fixed arm secured to said frame and extending therefrom, a movable arm loosely mounted in said frame, said arms and frame forming a substantially U-shaped unit, means pivotally mounted on each of said arms to hold a specimen in contact with said arms, a lever pivotally mounted on said frame, one end of said lever adapted to contact said specimen-holding means and hold them firmly against the specimen, a hooked member on the other end of said lever, means mounted on said movable arm to slidably engage said hook until said arm has moved a predetermined distance, and resilient means between said frame and said lever whereby said lever will be moved from contact with said specimen-holding means after said hook is disengaged.

3. A gage comprising a frame, a fixed arm secured to said frame and extending therefrom, a movable arm loosely mounted in said frame, said arms and frame forming a substantially U-shaped unit, specimen-engaging means mounted on the end of each arm, a clip arm pivotally mounted on each of said arms and having one end in opposed position to said specimen-engaging means, a straight resilient member extending from the other end of each clip arm, a lever pivotally mounted on said frame between said clip arms, one end of said lever engaging said straight resilient members, a hooked member on the other end of said lever, a trigger member mounted on said movable arm, said trigger member adapted to slidably engage said hooked member, a resilient member attached between said frame and the end of the lever engaging said straight resilient members, and an elongated flexible member mounted at its extremities to the ends of the arms opposite the specimen-engaging means.

4. A gage comprising a frame, a fixed arm secured to said frame and extending therefrom, a movable arm loosely mounted in said frame, said arms and frame forming a substantially U-shaped unit, specimen-engaging means mounted on the end of each arm, a clip arm pivotally mounted on each of said arms and having one end in opposed position to said specimen-engaging members, a straight resilient member extending from the other end of each clip arm, a lever pivotally mounted on said frame between said clip arms, one end of said lever engaging said straight resilient members, a hooked member on the other end of said lever, a trigger pin mounted on said movable arm, said trigger pin adapted to slidably engage said hooked member, a resilient member attached between said frame and the end of the lever engaging said straight resilient members, an elongated flexible member mounted at its extremities to the ends of said arms opposite the specimen-engaging means, and means to indicate the degree of flexing of said flexible member.

5. A gage comprising a frame, a fixed arm secured to said frame and extending therefrom, a movable arm loosely mounted in said frame, said arms and frame forming a substantially U-shaped unit, specimen-engaging means mounted on the end of each arm, a clip arm pivotally mounted on each of said arms, and having one end in opposed position to said specimen-engaging means, a straight resilient member extending from the other end of each clip arm, a lever pivotally mounted on said frame between said clip arms, one end of said lever engaging said straight resilient member, a hooked member on the other end of said lever, a trigger pin mounted on said movable arm, said trigger pin adapted to slidably engage said hooked member, a resilient member attached between said frame and the end of the lever engaging said straight resilient members, an elongated flexible member having one extremity fixedly mounted in the frame adjacent the fixed arm, and mounted at the other extremity to the end of the movable arm opposite said specimen-engaging means, and means mounted on said flexible member to indicate the degree of flexing.

6. A gage comprising a frame, a fixed arm secured to said frame and extending therefrom, a movable arm loosely mounted in said frame, said arms and frame forming a substantially U-shaped unit, specimen-engaging means mounted on the end of each arm, a first upright support mounted on each arm, a clip arm pivotally mounted on each upright support and having one end opposing said specimen-engaging means, a straight resilient member extending from the other end of each clip arm, a second upright support mounted on said frame between said clip arms, a lever pivotally mounted in said second support, one end of said lever engaging said straight resilient members, a hooked member on the other end of said lever, a trigger pin mounted on said movable arm, said trigger pin adapted to slidably engage said hooked member, a resilient member attached between said frame and the end of the lever engaging said straight resilient members, an elongated flexible member having one extremity fixedly mounted in the frame adjacent the fixed arm and mounted at the other extremity to the end of the movable arm opposite the specimen-engaging means, and means mounted on said flexible member to indicate degree of flexing.

JACK REBMAN.

REFERENCES CITED

The following references are of record in the file of this patent:

UNITED STATES PATENTS

| Number | Name | Date |
| --- | --- | --- |
| 361,056 | Emery | Apr. 12, 1887 |
| 862,765 | Shaffer | Aug. 6, 1907 |
| 1,531,111 | Lewis | Mar. 24, 1925 |
| 2,246,175 | Huggenberger | June 17, 1941 |
| 2,316,975 | Ruge | Apr. 20, 1943 |
| 2,416,664 | Ruge | Feb. 25, 1947 |
| 2,508,419 | Ramberg | May 23, 1950 |

FOREIGN PATENTS

| Number | Country | Date |
| --- | --- | --- |
| 47,987 | Great Britain | July 23, 1920 |
| 579,206 | Great Britain | July 26, 1946 |